Patented Mar. 4, 1941

2,233,973

UNITED STATES PATENT OFFICE 2,233,973

SLOW SETTING CEMENT

Thomas H. Dunn, Tulsa, Okla., assignor to Stanolind Oil & Gas Company, Tulsa, Okla., a corporation of Delaware No Drawing. Application June 22, 1939,
Serial No. 280,585

12 Claims. (Cl. 106—24)

This invention relates to slow setting cements and a method of making them and more particularly to slow setting cements used in cementing operations in oil and gas well work.

Large quantities of cement are used in oil wells in cementing casing to exclude water, in cement squeeze jobs, and in other phases of oil field practice well known to those familiar with the art. Cement is placed at the desired point in various ways such as pumping the cement through the casing or tubing, lowering the cement into the hole by means of a dump bailer or other methods. It is essential that the cement does not set before it is placed in the desired position and it is desirable that the cement be as fluid as the particular job permits. For deep well cementing ordinary oil well cement is unsuitable largely because of the decreased setting time of the cement due to relatively high subsurface temperatures and pressures. In many instances before ordinary cement can be placed in position, a stiffening or gelling of the slurry occurs which requires abnormal pump pressures to complete the job.

In addition to rendering a cement difficult to pump and decreasing the time required for gellation to occur within the cement slurry, deterioration of the cement itself results when the cement is agitated during this stiffening or gelling period.

In plug back and squeeze cementing where the slurry is required to be forced out into the water-bearing formations, the cement comes to rest, or nearly so, under high temperature conditions. Also a considerable length of drill pipe or tubing must be worked into a body of cement in the hole. The first danger is that the slurry will gel, thus making a satisfactory job impossible. The second danger is that of sticking the pipe. A cement which remains fluid for a comparatively long period removes the hazard and improves the results of this type of job.

The foregoing is not intended to cover all phases of oil well cementing but is mentioned to show the desirability of retarding the setting time of ordinary Portland cement as well as to decrease the viscosity and gel strength of the cement slurry.

It is an object of this invention to overcome the difficulties above mentioned. Another object of this invention is to produce new and improved slow setting cements. A further object of this invention is to provide new methods of making slow setting cements. A still further object of this invention is to provide slow setting cements having improved properties for use under high pressure conditions encountered in oil and gas wells. Other and more detailed objects, advantages, and uses of my invention will become apparent as the description thereof proceeds.

Various slow setting cements have been used and proposed in which a number of different materials have been used to delay the setting time. Amongst such materials are the ordinary phosphates, i. e. the normal and acid ortho-phosphates.

I have found that results far superior to those obtainable with the ordinary phosphates heretofore used, can be obtained by the use of very small quantities of certain metaphosphates, namely the polymerized metaphosphates, in small quantities in cements.

Thus for instance in one particular lot of Portland cement the addition of 0.10% of sodium hexametaphosphate increased the initial setting time, as determined by the use of the Vicat needle tester, from 4 hours and 45 minutes to 17 hours and 55 minutes. Similarly the final setting time as determined with the Vicat tester was increased from 6 hours and 20 minutes, without the addition of a retarder, to 19 hours and 40 minutes, in the presence of 0.10% of sodium hexametaphosphate.

The vastly superior results obtainable by the use of sodium hexametaphosphate as compared with various other phosphates is shown by the following table:

| Chemical | Weight percent | Retards vicat initial set | Retards vicat final set |
|---|---|---|---|
| | | Hrs. Min. | Hrs. Min. |
| Sodium hexametaphosphate | 0.10 | 12  25 | 13  20 |
| Sodium acid pyrophosphate | 0.10 | 0  45 | 40 |
| Tetra sodium pyrophosphate | 0.10 | 1  0 | 1 |
| Trisodium phosphate | 0.10 | 3  10 | 2  55 |
| Disodium phosphate | 0.10 | 2  45 | 2  15 |

Moreover these results obtainable with sodium hexametaphosphate and other polymerized metaphosphates cannot be duplicated by the use of even larger quantities of various of the other phosphates. Thus for example the use of 0.20% of sodium acid pyrophosphate increased the initial setting time only 4 hours, while the use of 0.40% of tetra sodium pyrophosphate gave a retardation of only 8 hours and 35 minutes.

Sodium hexametaphosphate can be made in various ways and is an article of commerce. It is believed to have the formula $Na_6(PO_3)_6$ but various other forms include $Na_5:Na(PO_3)_6$ and $Na_4:Na_2(PO_3)_6$ may be present and are also known as sodium hexametaphosphate.

Moreover other alkali metal metaphosphates, particularly hexametaphosphates, can be used, and in this term I include not only the lithium, sodium, potassium, caesium, and rubidium metaphosphates but also the corresponding ammonium salts which have chemical properties similar to the other alkali metal compounds mentioned. Also the corresponding mixed salts can be used, for instance five of the sodium atoms of sodium hexametaphosphate can be replaced with ammonium to form a substance with the empirical composition $(NH_4)_5Na(PO_3)_6$. The corresponding acid salts can also be used and are included within the expression "alkali metal metaphosphates."

Further, while I prefer to use an alkali metal hexametaphosphate, more particularly sodium hexametaphosphate, other metaphosphates which may be defined as salts of $(HPO_3)_n$ in which $n$ is an integer having a value of at least two, can be used. In other words the alkali metal salts of metaphosphoric acid polymers are preferred.

Another example of a desirable compound for use in my invention is sodium tetrametaphosphate, which is believed to have the formula $Na_4(PO_3)_4$. In the case of these other metaphosphates and as in the case of the hexametaphosphates, the various alkali metal salts (including ammonium compounds, the mixed salts, and the acid salts) can be used.

The amount of alkali metal metaphosphate used varies with the particular cement, the particular metaphosphate chosen and the desired retardation in setting time desired. In general the amount ranges from 0.01% to 1.00% and preferably from 0.03% to 0.30%.

As illustrating the effect of sodium hexametaphosphate in retarding the setting time of various cements, six different brands of Portland cement having initial setting times at 70° F., ranging from 4 hours and 25 minutes to 6 hours and 40 minutes, were each treated by adding 0.10% of sodium hexametaphosphate to the dry cement and the treated cements had initial setting times ranging from 13 hours and 25 minutes to 20 hours. The average results are given in the following table:

|  | Initial set at 70° F. | Final set at 70° F. |
|---|---|---|
|  | Hrs. Min. | Hrs. Min. |
| Average for untreated cement | 5  44 | 7  18 |
| Average for treated cement | 16  33 | 18  36 |

It will be apparent that these retardations make possible the use of my new treated cements under field conditions where ordinary cements, or even cements with prior art retarders, would cause great difficulty, due to rapid setting. Thus, for instance, if the setting time is low, an enormous amount of cement must be gotten into the well in a very short time, with the result that a large crew of men must be used, with consequent increased expense.

Moreover, cements with prior art retarders which show reasonably satisfactory properties when tested at atmospheric pressure, appear to disintegrate in the well and give complete unsatisfactory results under the temperature and pressure conditions encountered in oil and gas wells, while cements with my retarders, function under the high temperatures and pressures encountered in well operations in the same manner as at atmospheric temperature and pressure.

Another striking advantage of my cements is that the tensile strength is not substantially reduced by the use of my retarders while most other retarders cause marked reductions in tensile strength. Thus the use of 0.10% of sodium hexametaphosphate reduced the 14 day tensile strength of one cement by only 5% while the use of 0.05% of this compound actually increased the 7 day tensile strength of another cement by 3%.

I prefer to use these retarders in Portland cement but they can be used in other cements as well.

Instead of mixing the dry retarder with the dry cement the retarder can be added to the water used in making the slurry or otherwise incorporated in the cement or concrete.

I claim:

1. A method of retarding the setting time of cement comprising adding an alkali metal hexametaphosphate thereto.

2. A method of retarding the setting time of a cement comprising adding thereto a small but effective amount of sodium hexametaphosphate.

3. A method of retarding the setting time of a Portland cement comprising introducing into said cement from about 0.01% to about 1.00% of an alkali metal salt of a metaphosphoric acid polymer.

4. A method of retarding the setting time of a cement comprising adding thereto from about 0.03% to about 0.30% of sodium hexametaphosphate.

5. A method of cementing a well comprising introducing into said well, a Portland cement slurry carrying a quantity of an an alkali metal salt of a metaphosphoric acid polymer equal to from 0.01% to about 1.00% of the Portland cement present in said slurry.

6. A method of cementing a well comprising introducing into said well a cement slurry carrying a minor quantity of sodium hexametaphosphate.

7. A slow setting Portland cement comprising from about 0.01% to about 1.00% of an alkali metal salt of a metaphosphoric acid polymer.

8. A slow setting cement comprising a small amount of an alkali metal hexametaphosphate.

9. A Portland cement for use under high pressures comprising from about 0.01% to about 1.00% of an alkali metal salt of a polymer of metaphosphoric acid.

10. A cement for use under high pressures comprising from about 0.03% to about 0.30% of an alkali metal hexametaphosphate.

11. A Portland cement slurry comprising an amount of an alkali metal salt of a metaphosphoric acid polymer equal to from about 0.01% to about 1.00% of the Portland cement present in said slurry.

12. A cement slurry comprising an amount of an alkali metal hexametaphosphate equal to from about 0.01% to about 1.00% of the weight of the cement.

THOMAS H. DUNN.

CERTIFICATE OF CORRECTION.

Patent No. 2,233,973.   March 4, 1941.

THOMAS H. DUNN.

It is hereby certified that error appears in the printed specification of the above numbered patent requiring correction as follows: Page 2, second column, line 41, claim 5, for "an an" read --an--; line 43, same claim, after the word "from" insert --about--; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents.